(12) United States Patent
White et al.

(10) Patent No.: US 7,077,439 B2
(45) Date of Patent: Jul. 18, 2006

(54) VEHICLE BUMPER AND METHOD OF MAKING SAME

(75) Inventors: Tommy E. White, Rochester Hills, MI (US); Adrian B. Chernoff, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/647,698

(22) Filed: Aug. 25, 2003

(65) Prior Publication Data

US 2005/0046226 A1 Mar. 3, 2005

(51) Int. Cl.
*B60R 19/02* (2006.01)

(52) U.S. Cl. ..................................... 293/120

(58) Field of Classification Search ........ 293/120–122, 293/132–133, 142–144, 146–148, 102–103; 296/187.03, 187.04, 187.09
See application file for complete search history.

(56) References Cited

U.S. PATENT DOCUMENTS

| | | | | |
|---|---|---|---|---|
| 5,215,343 A | * | 6/1993 | Fortune | 293/121 |
| 5,967,573 A | * | 10/1999 | Wang | 293/119 |
| 5,974,847 A | | 11/1999 | Saunders et al. | 72/57 |
| 5,997,058 A | * | 12/1999 | Pedersen | 293/102 |
| 6,022,057 A | * | 2/2000 | Vermeulen | 293/132 |
| 6,179,355 B1 | * | 1/2001 | Chou et al. | 293/132 |
| 6,209,935 B1 | * | 4/2001 | Kavc et al. | 293/155 |
| 6,224,120 B1 | * | 5/2001 | Eipper et al. | 293/118 |
| 6,253,588 B1 | | 7/2001 | Rashid et al. | 72/57 |
| 6,349,521 B1 | * | 2/2002 | McKeon et al. | 52/735.1 |
| 6,398,275 B1 | * | 6/2002 | Hartel et al. | 293/102 |
| 6,428,065 B1 | | 8/2002 | Sato et al. | 293/121 |
| 6,447,049 B1 | | 9/2002 | Tohda et al. | 296/180.1 |
| 6,467,831 B1 | * | 10/2002 | Mori et al. | 296/102 |
| 6,540,276 B1 | * | 4/2003 | Azuchi et al. | 293/102 |
| 6,684,505 B1 | * | 2/2004 | Sundgren et al. | 29/897.2 |
| 6,712,411 B1 | * | 3/2004 | Gotanda et al. | 293/155 |
| 6,726,258 B1 | * | 4/2004 | Sundgren et al. | 293/102 |

\* cited by examiner

*Primary Examiner*—H Gutman
(74) *Attorney, Agent, or Firm*—Kathryn A. Marra

(57) ABSTRACT

A vehicle bumper is formed using fluid pressure such that the bumper is characterized by a curvature. The bumper preferably includes an upper bumper bar portion and a lower bumper bar portion that are interconnected. The bumper is also preferably connectable to a pair of upper rails and a pair of lower rails so that an impact load is distributable between the upper rails and the lower rails. The bumper preferably includes an inner panel and an outer panel. A method of forming a bumper is also provided. The method includes subjecting a metal blank to fluid pressure to form a bumper having a shape characterized by a curvature.

8 Claims, 5 Drawing Sheets

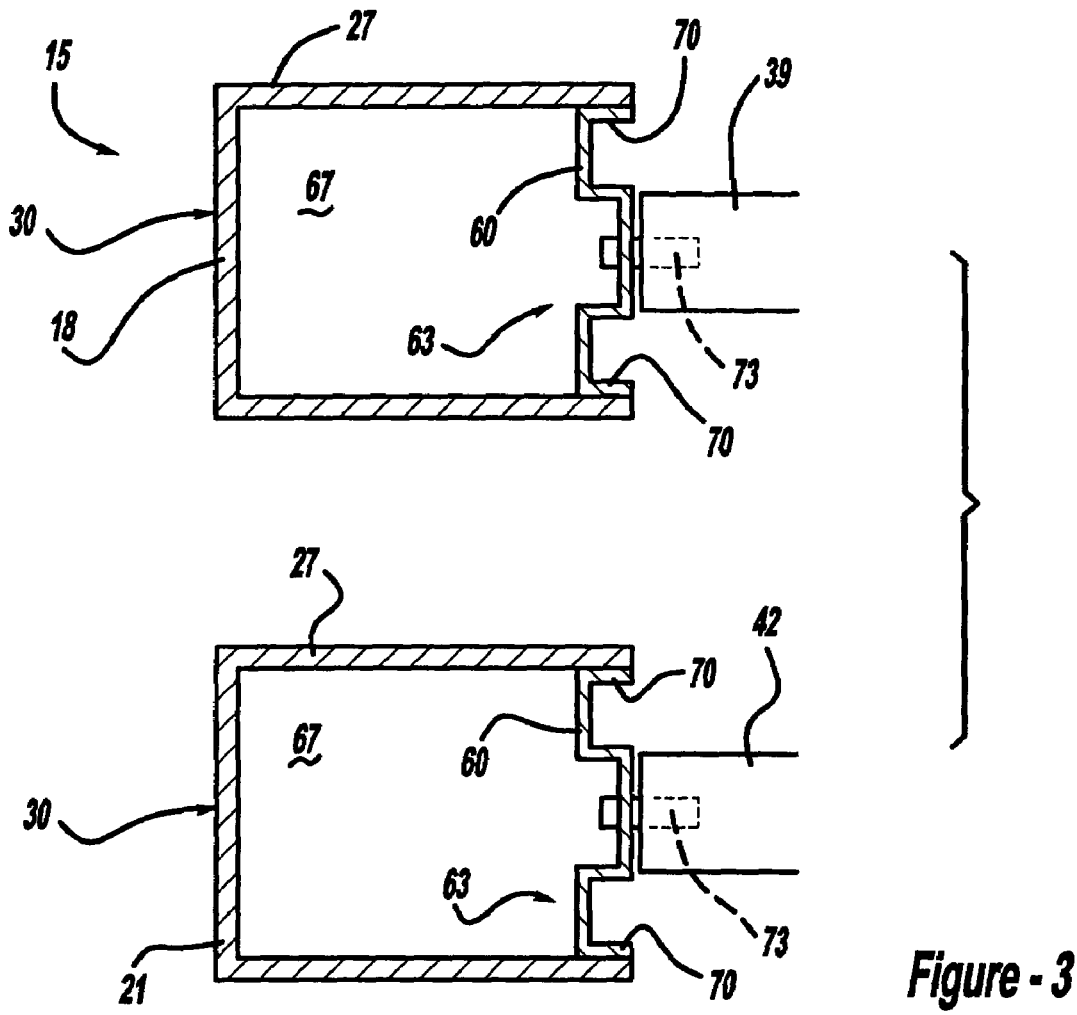
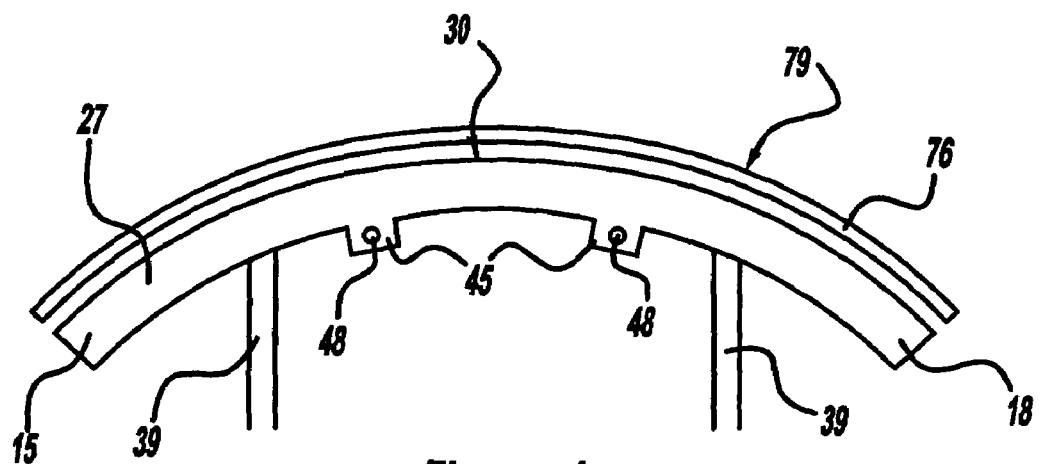
Figure - 3
Figure - 4

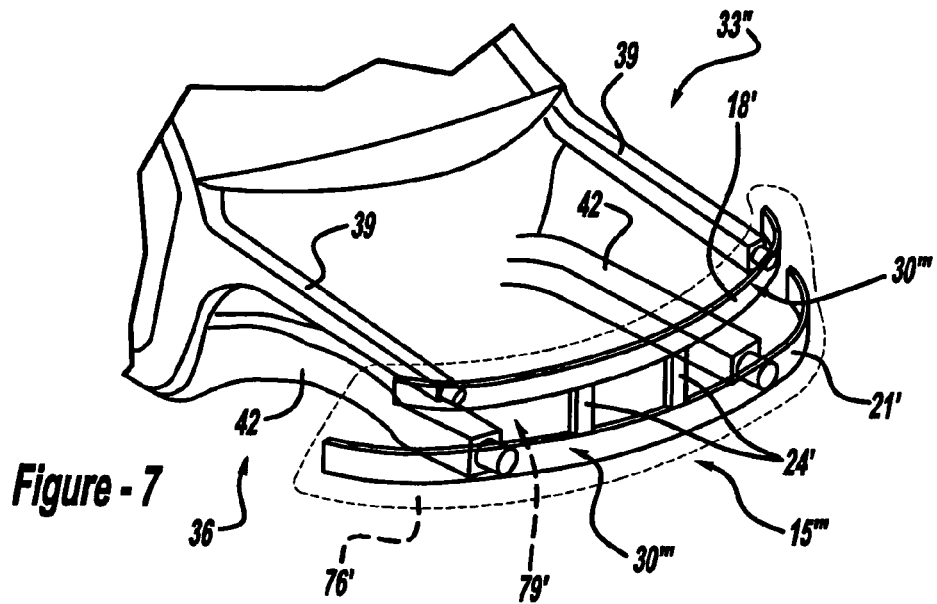
*Figure - 7*
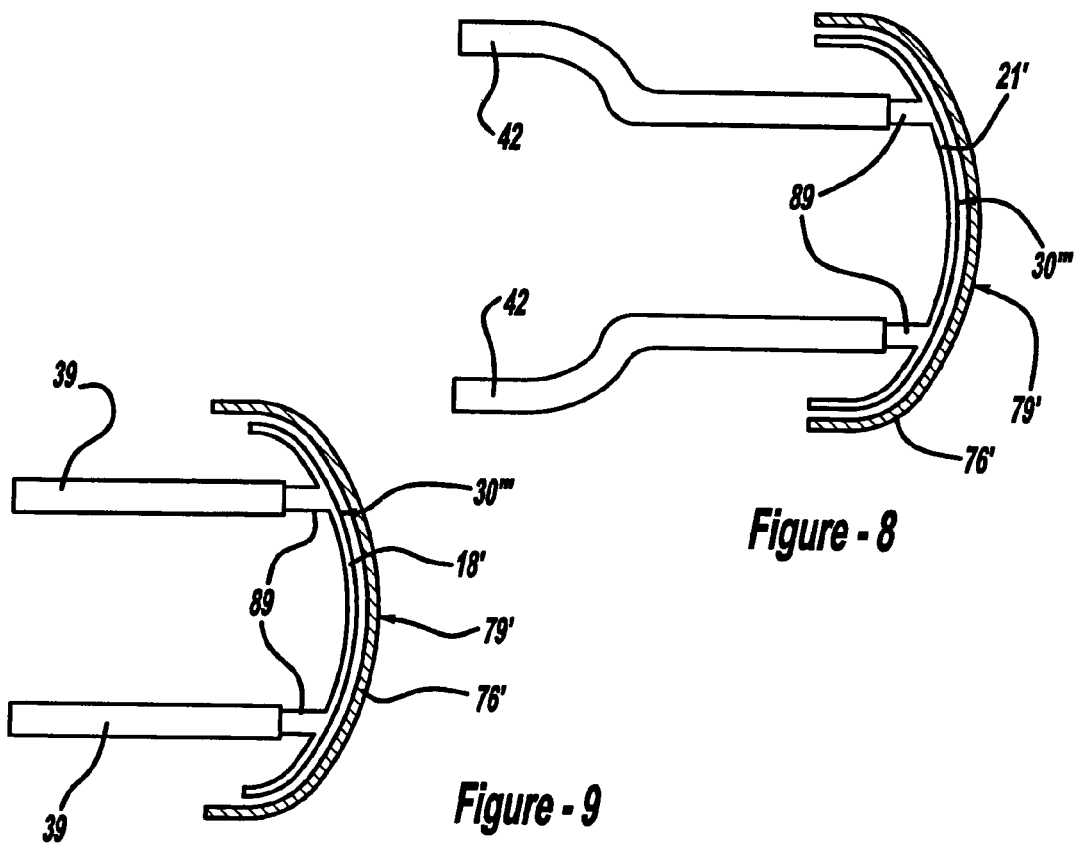
*Figure - 8*
*Figure - 9*

US 7,077,439 B2

VEHICLE BUMPER AND METHOD OF MAKING SAME

TECHNICAL FIELD

This invention relates to vehicle bumpers having a shape characterized by a curvature and formed using fluid pressure.

BACKGROUND OF THE INVENTION

Vehicle bumpers are typically placed at the forward or rearward portions of vehicles to receive low-speed vehicle impacts. Prior art bumpers are typically formed using processes such as roll forming, stamping, and extruding.

SUMMARY OF THE INVENTION

A bumper for a vehicle is provided. The bumper is mountable with respect to a vehicle frame so as to be located between the frame and the periphery of the vehicle. The bumper is preferably formed using fluid pressure so that the bumper is characterized by a complex curvature. The invention eliminates vehicle exterior styling design constraints imposed by linear prior art bumpers. The curvature of the bumper is preferably such that the bumper follows the desired exterior contours of the vehicle.

The size of the bumper, and correspondingly the amount of bumper surface area available to receive a load, is not limited by exterior styling demands since the bumper of the invention may be formed to conform to substantially any desired exterior surface configuration. For example, in a preferred embodiment, the bumper includes an upper bumper bar portion and a lower bumper bar portion interconnected by at least one generally vertically oriented portion.

Furthermore, the bumper is preferably configured to extend sufficiently upwardly so as to be mountable to a pair of lower rails and a pair of upper rails so that a load from an impact is distributed among a greater quantity of frame members than in the prior art; with such an arrangement the magnitude of the load borne by the lower rails in an impact event is lower than in prior art vehicles.

A method of manufacturing the vehicle bumper is also provided. The method includes subjecting a metal blank to fluid pressure to form a bumper having a shape characterized by a curvature. The use of fluid pressure enables the bumper to attain a more complex shape than prior art bumper shapes.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic cross sectional view of the bumper and vehicle frame of FIG. 1;

FIG. 4 is a schematic top view of the bumper of FIG. 1;

FIG. 7 is a schematic perspective view of yet another alternative embodiment of the bumper according to the claimed invention;

FIG. 8 is a schematic sectional view of the lower bumper bar of FIG. 7 taken along a horizontal plane;

FIG. 9 is a schematic sectional view of the upper bumper bar of FIG. 7 taken along a similar horizontal plane;

DESCRIPTION OF THE PREFERRED EMBODIMENTS

Figure 1:
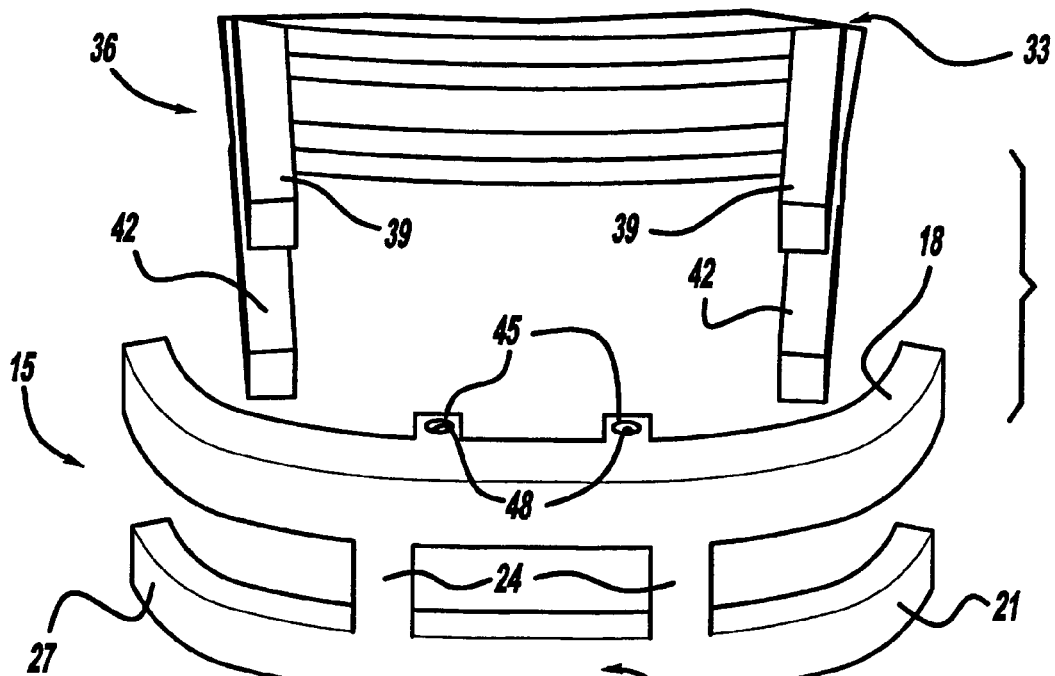
FIG. 1 is a schematic perspective exploded view of a vehicle bumper according to the claimed invention and a vehicle frame to which the bumper is fastened.

Referring to FIG. 1, a bumper 15 according to the invention is schematically depicted. The bumper 15 includes an upper bumper bar portion 18, a lower bumper bar portion 21, and two generally-vertically oriented portions 24 that interconnect the upper bumper bar portion 18 and the lower bumper bar portion 21. The bumper 15 includes an outer panel 27, a surface 30 of which is configured to face the forward or rearward end of a vehicle 33 in which the bumper 15 is installed for receiving an impact load in the event of an impact to the periphery of the vehicle. In the embodiment depicted, the bumper 15 is located in the forward section of the vehicle 33 with the surface 30 facing the forward end of the vehicle. However, the bumper 15 may be located in the rearward section of the vehicle (not shown) within the scope of the claimed invention.

The bumper 15 is connected to members of a vehicle frame 36. More specifically, the bumper 15 is connected to a pair of upper rails 39 and a pair of lower rails 42. The bumper 15 is adapted to receive a load at surface 30 in the event of an impact to the vehicle periphery and distribute at least a portion of the load between the upper rails 39 and the lower rails 42. The outer panel 27 includes tab portions 45 with holes 48 therein that may be employed to attach vehicle hardware such as a radiator.

Figure 2:
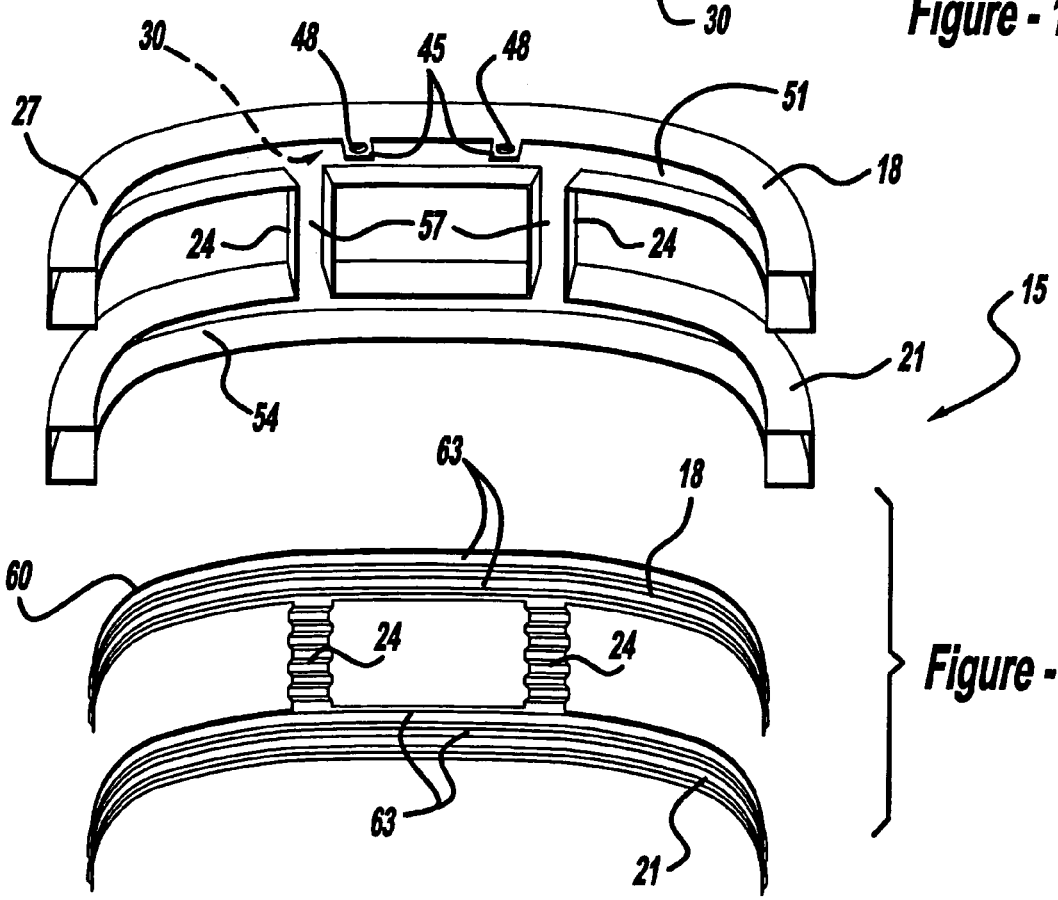
FIG. 2 is a schematic rear perspective exploded view of the bumper of FIG. 1.

Referring to FIG. 2, wherein like reference numbers refer to like components from FIG. 1, an exploded rear view of the bumper 15 is schematically depicted. The outer panel 27 is formed to include several U-shaped channels. A first U-shaped channel 51 is defined by the upper bumper bar portion 18; a second U-shaped channel 54 is defined by the lower bumper bar portion 21; and the vertically-oriented portions 24 each define a U-shaped channel 57. The U-shaped channels cooperate to define an outer panel concavity.

The bumper 15 also includes an inner panel 60. The inner panel 60 includes strengthening formations, i.e., corrugations 63. Within the scope of the claimed invention, the outer panel 27 may or may not be characterized by corrugations or other strengthening formations. The inner panel 60 is connected to the outer panel 27 to function as an end cap, spanning the open ends of, and thereby closing off, the channels 51, 54, 57. The outer panel 27 and the inner panel 60 each define at least a portion of the upper bumper bar portion 18, the lower bumper bar portion 21, and the vertically-oriented portions 24.

The bumper 15, including the surface 30 and the inner panel 60, has a shape characterized by a curvature. In order to achieve the shape and curvature, the inner panel 60 and the outer panel 27 are formed using fluid pressure. Superplastic forming, quick plastic forming, or sheet hydroforming is preferably employed.

Superplastic forming is described in U.S. Pat. No. 5,974,847, issued Nov. 2, 1999 to Saunders, et al, which is hereby incorporated by reference in its entirety. When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material. Each of panels 27, 60 of the design discussed above can be fabricated in one piece using such techniques.

In addition to various steels and aluminum alloys, other structural materials such as zinc, brass, magnesium, titanium and their alloys have also been reported to exhibit superplastic behavior. Furthermore, certain polymers and reinforced polymer composites have the required ductility to make the panels 27, 60. These materials and other metal matrix composites could also be used to make the panels 27, 60 of this invention, if desired.

In an example of superplastic forming (SPF), a blank, i.e., a sheet, is tightly clamped at its edges between complementary surfaces of opposing die members. At least one of the die members has a cavity with a forming surface opposite one face of the sheet. The other die opposite the other face of the sheet forms a pressure chamber with the sheet as one wall to contain the working gas for the forming step. The dies and the sheet are heated to a suitable SPF condition for the alloy. For SPF aluminum alloys, this temperature is typically in the range of 400° C. to 550° C. Electric resistance heating elements are located in press platens or sometimes embedded in ceramic or metal pressure plates located between the die members and the platens. A suitable pressurized gas such as argon is gradually introduced into the die chamber on one side of the sheet, and the hot, relatively ductile sheet is stretched at a suitable rate until it is permanently reshaped against the forming surface of the opposite die. The rate of pressurization is controlled so the strain rates induced in the sheet being deformed are consistent with the required elongation for part forming. Suitable strain rates are usually 0.0001 to 0.01 s$^{-1}$. During the deformation of the sheet, gas is vented from the forming die chamber.

The '847 patent provides a method of stretch forming a ductile metal sheet into a complex shape involving significant deformation without excessive thinning of the sheet material and without tearing it. The method is particularly applicable to the stretch forming of superplastic alloys heated to a superplastic forming temperature. In the method, additional material from the initially flat sheet blank is pulled or drawn into the forming cavity for stretch forming. The additional material significantly reduces thinning and tearing in the formed part.

The method contributes to thickness uniformity in an SPF stretch-formed component by utilizing controlled draw-in of sheet metal to the forming chamber prior to application of gas pressure. In an illustrative practice, a preform, similar to a stationary male punch, is placed on the forming press platen opposite the die cavity. An aluminum blank, for example, is placed over the insert and heated to a suitable SPF temperature for the alloy. The die is then moved toward its closed position against the platen. In its closing motion, the die engages the edges of the aluminum sheet. The heated metal is pulled over and around the insert, and draw-in of blank material thus occurs. This results in a greater amount of metal in the die cavity prior to SPF blow forming. The quantity of additional metal can be managed by design of the size, shape and location of the preform on the platen or complementary die member. But the additional metal in the die cavity reduces the amount of strain required and, hence, the amount of thinning to form a desired geometry compared to conventional SPF.

Thus, by the judicious use of a suitable space-occupying metal preform on a die or platen member opposite the forming die, additional metal is easily drawn into the cavity during die closure without significantly increasing the complexity of the tooling. Care is taken in the design of the preform to avoid excessive wrinkling of the drawn-in metal and to maintain a tight gas seal at the periphery of the sheet upon full die closure. The uniformity in thickness of the stretch-formed part is improved. Mass of the formed part can be reduced because the designer does not need to resort to thicker blanks to assure part quality. And, except for the simple preform, there is no increase in the complexity of the SPF tooling.

Quick plastic forming is described in U.S. Pat. No. 6,253,588, issued Jul. 3, 2001 to Rashid, et al, which is hereby incorporated by reference in its entirety. For quick plastic forming, a preferred alloy is Aluminum Alloy 5083 having a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum. Generally, the alloy is first hot and then cold rolled to a thickness from about one to about four millimeters.

In the AA5083 alloys, the microstructure is characterized by a principal phase of a solid solution of magnesium in aluminum with well-distributed, finely dispersed particles of intermetallic compounds containing the minor alloying constituents, such as $Al_6Mn$.

Using QPF, large AA5083-type aluminum-magnesium alloy sheet stock may be formed into a complex three-dimensional shape with high elongation regions, like an SPF-formed part, at much higher production rates than those achieved by SPF practices. The magnesium-containing, aluminum sheet is heated to a forming temperature in the range of about 400° C. to 510° C. (750° F. to 950° F.). The forming may often be conducted at a temperature of 460° C. or lower. The heated sheet is stretched against a forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming. Thus, by working a suitably fine grained, aluminum alloy sheet at significantly lower temperatures and continuously increased, higher gas pressures than typical SPF practices, significantly faster and more practical forming (at least for the automobile industry) times are achieved.

Referring to FIG. 3, wherein like reference numbers refer to like components from FIGS. 1 and 2, a cross sectional view of the bumper 15 is schematically depicted. The inner panel 60 and the outer panel 27 define a cavity, or open space 67, therebetween. Optionally, and within the scope of the claimed invention, the open space 67 may contain energy absorption material such as polyurethane foam or aluminum honeycomb, or reinforcing material to strengthen the bumper 15, depending on the desired bumper characteristics. The inner panel 60 is welded to the outer panel 27 at weld flanges 70. Threaded fasteners 73 fasten the inner panel 60 to the upper rails 39 and the lower rails 42. The threaded fasteners may be welded to the inner panel 60 prior to welding the outer panel to the inner panel. A nut (not shown) may be threaded onto each threaded fastener 73 at an opening (not shown) formed in each of the upper rails 39 and the lower rails 42 to retain the inner panel to the rails.

Referring to FIG. 4, wherein like reference numbers refer to like components from FIGS. 1–3, the bumper 15 (not shown to scale) is at least partially located between the frame members, including upper rails 39, and a fascia 76. The fascia 76 defines a portion 79 of the exterior surface of the vehicle and correspondingly a forward portion of the vehicle periphery. The portion 79 of the exterior surface of the vehicle defined by the fascia 76 is characterized by a curvature substantially identical to the curvature of the bumper 15. Within the scope of the claimed invention, the bumper may be employed in a vehicle without a fascia such that the bumper forms a portion of the exterior surface of the vehicle and the vehicle periphery.

Figure 5:
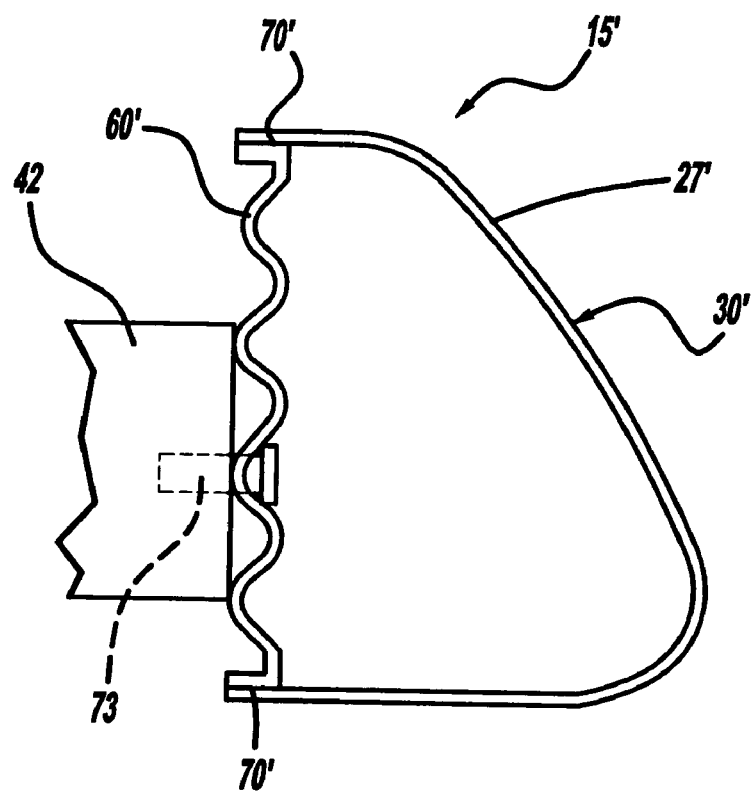
FIG. 5 is a schematic cross sectional view of an alternative embodiment of the bumper according to the claimed invention.

FIG. 5 is a schematic cross sectional view of an alternative embodiment of the bumper 15'. The bumper 15' of FIG. 5 includes an inner panel 60' and an outer panel 27'. The outer panel surface 30' at which an impact load from the vehicle periphery is received is oblique; that is, the surface 30' is characterized by a slope.

Figure 6:
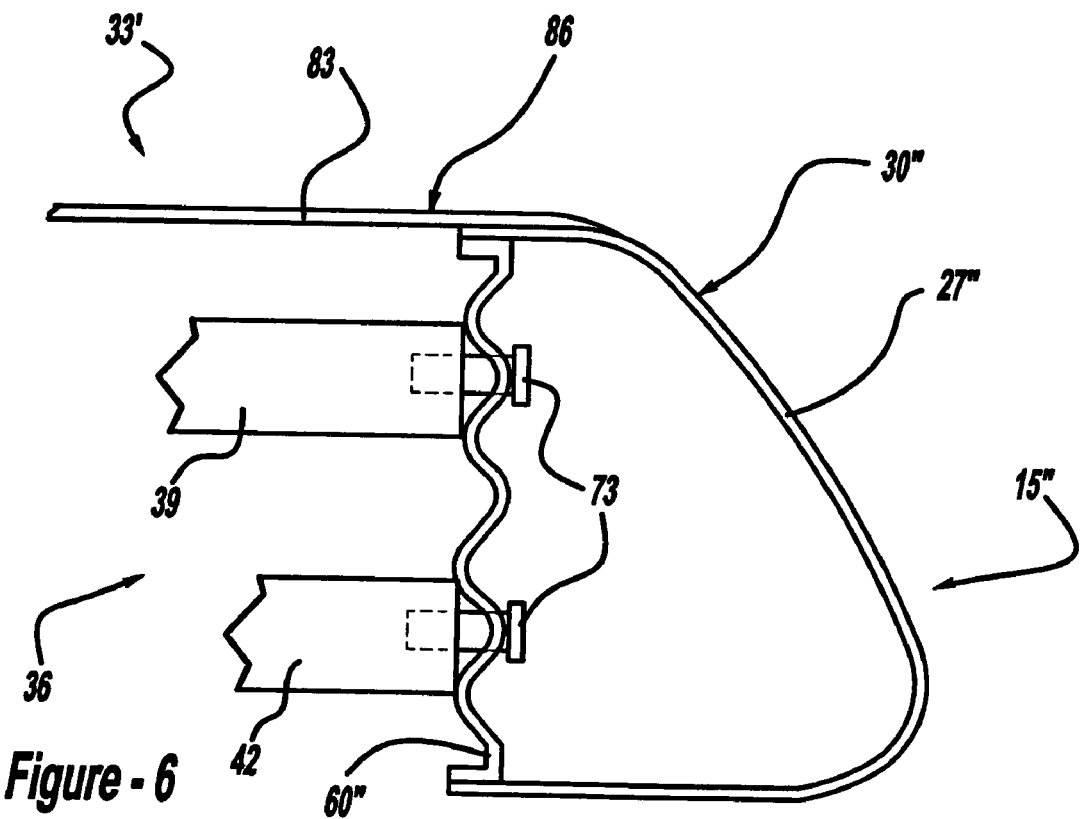
FIG. 6 is a schematic cross sectional view of another alternative embodiment of the bumper according to the claimed invention.

FIG. 6 is a schematic depiction of yet another alternative embodiment of the bumper 15''. Bumper 15'' is fastened to the upper and lower rails 39, 42 of a vehicle frame 36. The vehicle 33' of which the bumper 15'' is a part also includes body panels such as a hood 83. The hood 83 forms a first portion 86 of the exterior surface of the vehicle. Bumper outer panel surface 30'' forms a second portion of the exterior surface of the vehicle and a portion of the vehicle periphery. The bumper 15'' and the hood 83 are adjacent to one another such that the first portion 86 and the second portion 30'' of the vehicle exterior surface are contiguous or appear contiguous. Thus, the bumper 15'' and the hood 83 cooperate to form a substantially continuous, uninterrupted section of vehicle exterior surface. Within the scope of the claimed invention, the bumper 15'' may be adjacent to other body panels, such as fenders, rear quarter panels, rear decklids, etc., that form a portion of a vehicle exterior such that the portion formed by the bumper and the portion formed by the body panel are substantially contiguous and cooperate to define a substantially uninterrupted section of the exterior vehicle surface. The inner panel 60'' provides bumper assembly 15'' with strength; outer panel 27'' functions as a fascia by concealing the inner panel 60'' from view from the exterior of the vehicle and providing an aesthetically-pleasing exterior surface.

FIG. 7 is a schematic depiction of yet another alternative embodiment of the bumper 15'''. The bumper 15''' includes an upper bumper bar 18' connected to upper rails 39 and a lower bumper bar 21' connected to lower rails 42. Two vertically oriented members 24' interconnect the upper and lower bumper bars 18', 21' so that a portion of an impact load received by one of the bumper bars is transmitted to the other of the bumper bars in the event of a low-speed vehicle impact. Impact load is thereby distributed among the upper rails and the lower rails. In the scope of the claimed invention, a bumper "portion" may or may not be an individual member operatively connected to other bumper members. Thus, the upper bumper bar 18' is an "upper bumper bar portion" within the scope of the claimed invention.

Figure 10:
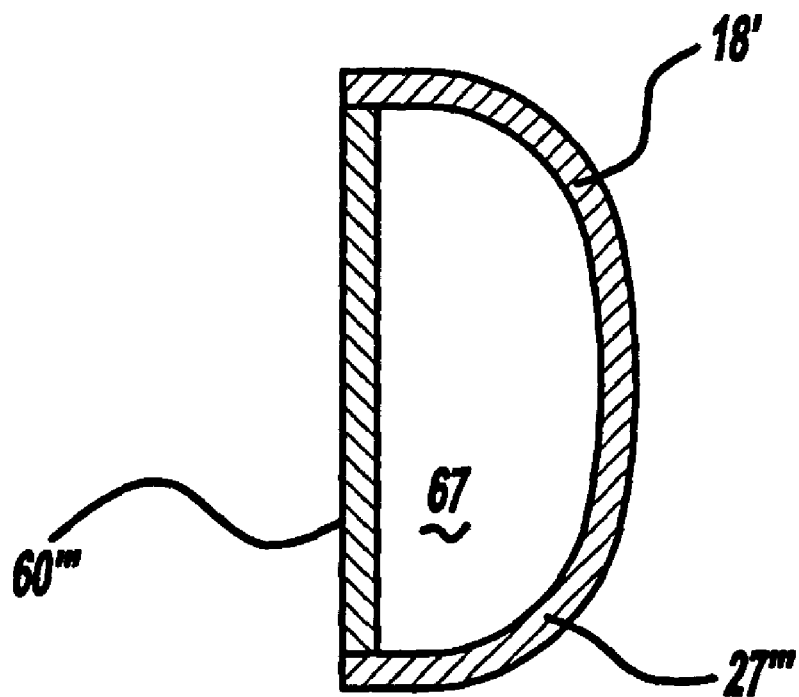
FIG. 10 is a schematic cross sectional view of a portion of the upper bumper bar of FIG. 7 taken along a vertical plane.
Figure 11:
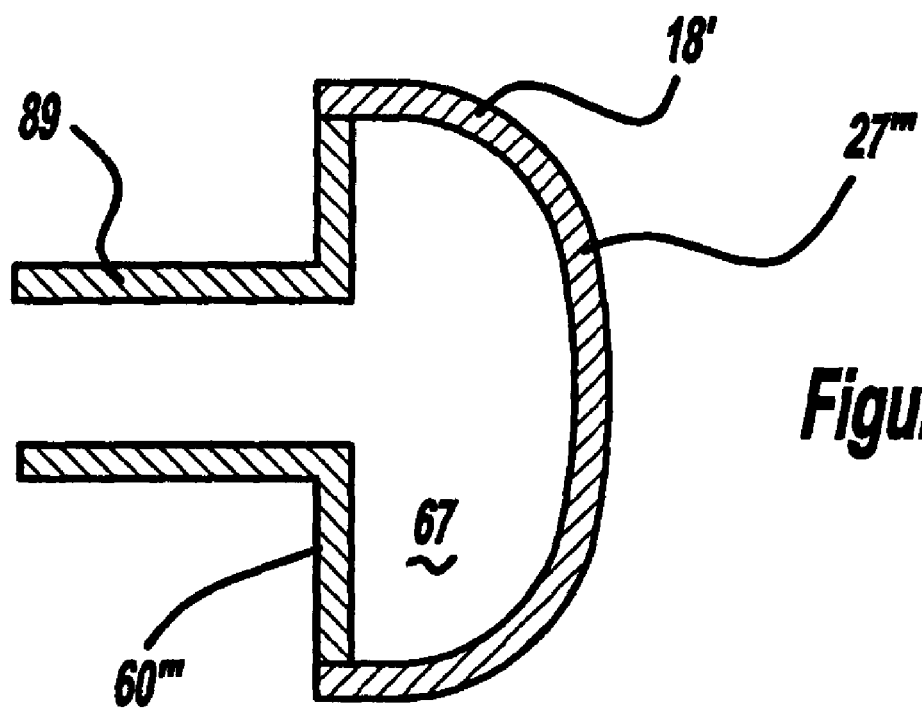
FIG. 11 is another schematic cross sectional view of a portion of the upper bumper bar of FIG. 7 taken along a vertical plane to include energy-absorbing portions.

Referring to FIGS. 8 and 9, wherein like reference numbers refer to like components of FIGS. 1–7, the bumper bars 18', 21' include integral energy-absorbing cylinders 89 at which the bumper bars 18', 21' attach to the vehicle frame members 39, 42. Each bumper bar 18', 21' is at least partially formed using fluid pressure. The curvature of the bumper bars is substantially identical to the curvature of a portion 79' of the exterior surface of the vehicle formed by fascia 76'. FIG. 10 is a schematic cross section of the upper bumper bar 18'. The cross section of the lower bumper bar is substantially similar. The upper bumper bar 18' includes an inner panel 60''' and an outer panel 27''' operatively connected to one another. The inner panel 60''' is preferably welded to the outer panel 27'''. It may be preferable for the inner panel to have weld flanges as shown in FIGS. 3, 5, and 6 to facilitate welding. FIG. 11 is a schematic cross section of the upper bumper bar 18' and an integral energy-absorbing cylinder 89. The cylinder 89 is a portion of the inner panel 60''' and is configured to crumple in the event of a vehicle impact and thereby absorb energy.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a frame including at least one structural frame member;
a body panel forming a first portion of the vehicle exterior surface; and
a metal bumper mounted with respect to said at least one structural frame member for receiving a load in the event of an impact to a portion of the vehicle periphery, the metal bumper including a one-piece inner panel and a one-piece outer panel operatively connected to the one-piece inner panel, wherein the metal bumper forms a second portion of the vehicle exterior surface;
wherein at least a portion of the bumper is characterized by a curvature;
wherein the first portion and the second portion of the vehicle exterior surface are substantially contiguous; and
wherein the inner panel and the outer panel define a cavity therebetween.

2. The vehicle of claim 1, wherein said at least one structural frame member includes two lower rails and two upper rails, and wherein the bumper is operatively connected to the two lower rails and the two upper rails such that the load received by the bumper is at least partially distributed to the two lower rails and the two upper rails.

3. The vehicle of claim 1, wherein the bumper includes an upper bumper bar portion, a lower bumper bar portion, and a portion interconnecting the upper bumper bar portion and the lower bumper bar portion.

4. The vehicle of claim 3, wherein the inner panel and the outer panel each at least partially define the upper bumper bar portion, the lower bumper bar portion, and the portion interconnecting the upper bumper bar portion and the lower bumper bar portion.

5. The vehicle of claim 1, wherein the inner panel is characterized by strengthening formations.

6. The vehicle of claim 5, wherein the inner panel or the outer panel is formed using a process selected from the group consisting of quick plastic forming, superplastic forming and sheet hydroforming.

7. The vehicle of claim 1, wherein the bumper includes an integral tab defining a hole.

8. A vehicle comprising:
two upper rails and two lower rails; and
a metal bumper mounted with respect to the two upper rails and the two lower rails for recieving a load in the event of an impact to the periphery of the vehicle, the bumper having a one-piece outer panel and a one-piece inner panel operatively connected to the one-piece outer panel and at least partially corrugated;
wherein the inner panel and the outer panel are characterized by a curvature that is the result of exposure to fluid pressure.

\* \* \* \* \*